April 28, 1959 — T. G. NESSLER — 2,883,910
AIRBORNE STORE EJECTOR BOLT
Filed June 18, 1956
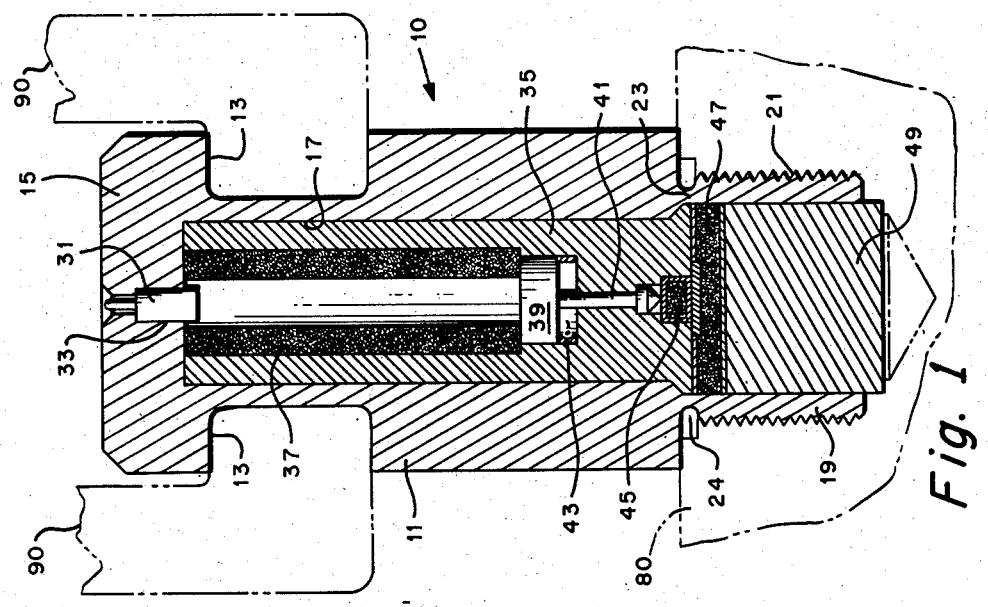
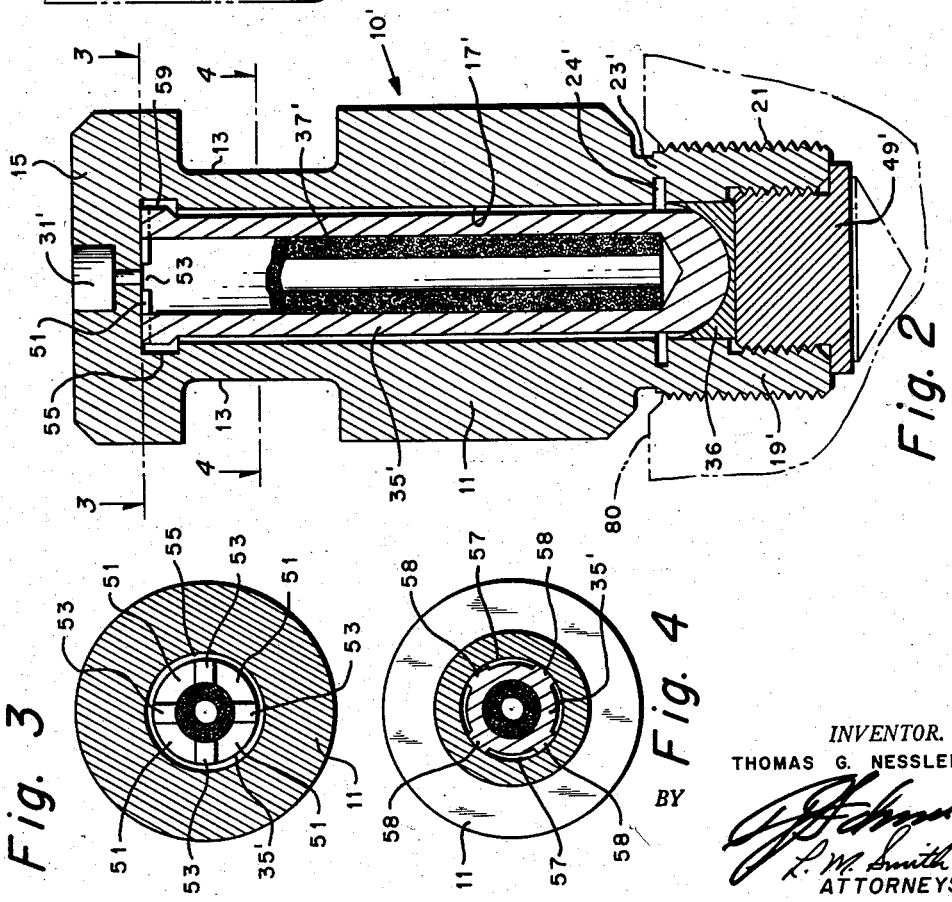
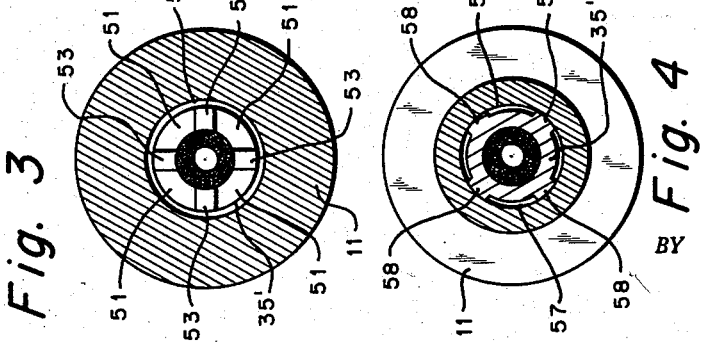
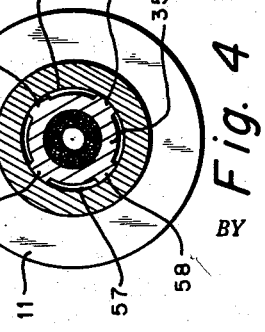
INVENTOR.
THOMAS G. NESSLER,
BY
ATTORNEYS United States Patent Office 2,883,910
Patented Apr. 28, 1959

2,883,910

AIRBORNE STORE EJECTOR BOLT

Thomas G. Nessler, Philadelphia, Pa., assignor to the United States of America as represented by the Secretary of the Navy Application June 18, 1956, Serial No. 592,220

4 Claims. (Cl. 89—1.5)

(Granted under Title 35, U.S. Code (1952), sec. 266)

The invention described herein may be manufactured and used by or for the Government of the United States of America without the payment of any royalties thereon or therefor.

The instant invention relates to an airborne store ejector bolt, and more particularly to an airborne store ejector bolt by means of which an airborne store such as a bomb may be sequentially disconnected from and then ejected from an aircraft by a minimized explosive force.

While there are many known means for releasing and ejecting bombs or other stores from an aircraft in flight including mechanical, electrical, and hydraulic devices and combinations thereof, considerable current interest centers on various known types of explosively operated mechanisms for releasing and ejecting stores from an aircraft. One known explosively operated device of this type, identified as the explosive bolt Aero X2A, consists of an explosive filled, multiple chambered bolt housed within an ejector tube comprising a mechanism which is rigidly connected both to the store and to the airframe of an aircraft upon which it is mounted. Detonation of the ejection charge within the bolt of this device ruptures the bolt which forms the connection between an aircraft and the store supported thereby and then ejects the store from the aircraft by means of the pressure exerted by explosive gases confined within the ejector tube and acting on the ruptured end of the bolt. However, in this device the rupture occurs only after the explosive force has reached a relatively high level with consequent development of severe reaction loads. A second well-known method combining mechanical features and explosive energy consists of a piston-cylinder combination arranged to eject a store from an aircraft upon the release of mechanically operated hooks with the ejection force generated by energy released from an explosive cartridge. These explosively operated mechanisms share numerous disadvantages inherent in their design configurations and their mode of operation. Erosion and corrosion defects caused by the explosive gases acting on the confining walls and internal parts of the portions of these mechanisms permanently installed in an aircraft interfere with ready reuse of these mechanisms in successive missions. Both of these relatively heavy mechanisms impose added aircraft weight penalties with a resulting decrease in the range and payload of the aircraft due to the necessity of carrying the ejection tube of the former mechanism or the piston-cylinder arrangement of the latter mechanism both to and from the target area. The relative complexity and large number of parts incorporated in each of these mechanisms increases both initial cost and the cost of upkeep and complicates maintenance problems. In addition, the explosive bolt Aero X2A mechanism utilizes the high pressure necessary to sever the connection between the store and an aircraft to eject the store, thus imposing an extremely high concentrated load on the immediately adjacent portion of the airframe with the attendant possibility of substantially weakening or causing complete failure of critical structural elements such as the wing spar. Moreover, the explosive bolt mechanism referred to above as presently conceived contains no provision for mechanically jettisoning the store in the event of electrical power failure in an aircraft to which it is attached by this mechanism.

The present invention contemplates an airborne store ejector bolt assembly suitable for use as a single point suspension for an airborne store and comprising a compact, light weight, self-contained, inexpensive "one shot" frangible ejector unit having an exterior configuration designed for jettisoning by operation of a mechanical release means in the event of failure of the electrical power system in an aircraft in which this device is installed. Thus, the device characterizing the instant invention typically serves as the sole connecting member between a suspended store and an aircraft to which it is attached thereby, and, when electrically detonated, this device severs this single connection and provides the downward ejection force necessary to overcome the inherently poor aerodynamic store separation characteristics induced by the high flight speed of the current military aircraft.

An object of the instant invention is the provision of a compact, lightweight, explosively operated airborne store ejector bolt assembly arranged for emergency mechanical release.

Another object is to provide a self-contained expendable airborne store ejector bolt assembly, which eliminates maintenance problems attendant upon corrosion and erosion effects of explosive gases by disposal of all parts so affected.

Still another object is the provision of an airborne store ejector bolt assembly which minimizes concentrated loads imposed upon adjacent aircraft structure by virtue of its operation, by providing for rupture of the bolt at a pressure substantially below the maximum ejection pressure developed.

A final object is the provision of an airborne store ejector bolt assembly with so few parts that it may be produced inexpensively and arranged to be disposable to eliminate maintenance costs and delays in rearming aircraft.

Other objects and many of the attendant advantages of this invention will be readily appreciated as the same becomes better understood by reference to the following detailed description, considered in connection with the accompanying drawings wherein:

Fig. 1 shows a cross-sectional view taken on the longitudinal axis of a preferred embodiment of the instant invention, Fig. 2 is a corresponding longitudinal cross section of another embodiment of the instant invention, Figure 3 is a cross section taken on line 3—3 of Fig. 2, and Fig. 4 is a cross section taken on line 4—4 of Fig. 2.

Referring now to the drawings wherein like reference numerals refer to like or corresponding parts, the showing in Fig. 1 includes an airborne store ejector bolt assembly generally designated by the reference numeral 10 threadably engaged with a suitable well in the upper side of an airborne store, such as a bomb, a broken away portion of which is represented by phantom lines in Fig. 1 and designated by the reference numeral 80. The ejector bolt assembly 10, as shown in Fig. 1, is also engaged with a pair of supporting elements, broken away portions of which are represented in Fig. 1 by phantom lines and designated by the reference numeral 90. The element 90 may be the bomb supporting hooks of a conventional shackle assembly or other suitable supporting means mounted within the wing or fuselage structure of an aircraft or within a pylon depending therefrom and mechanically operable to release the elements 90 from engagement with the ejector bolt assembly 10. It is to be understood that recessed portions 13 of the bolt cylinder 11 of the ejector bolt assembly 10 are shown in a representative shape only and that the configuration of the recesses 13 may be modified as necessary to properly cooperate with variously shaped supporting elements 90. As shown, the recesses 13 represent opposite sides of an annular groove, but they may be opposed recesses on opposite sides of the assembly 10, if so desired. The bolt cylinder 11, which may conveniently be generally cylindrical in external shape, as indicated in Figs. 3 and 4, terminates at its upper end in an end portion 15 preferably formed integrally with the circumferential sidewall of the cylinder 11 to form a cylindrical chamber 17 therein open to the exterior of the bolt cylinder 11 at its lower end, and said cylinder includes an externally threaded portion at its lower end 19 which may be reduced in outside diameter relative to the remainder of the cylinder and be provided with external threads 21 for engagement with corresponding internal threads in a store to be supported thereby. The portion 19 is connected to the remainder of the bolt cylinder 11 by a substantially reduced cross section 23 formed by an annular groove 24 which insures separation of the respective portions of the bolt cylinder at this point in response to the forces exerted by the explosive charge provided for this purpose. A suitable igniter assembly 31, which may conveniently be an electrically actuated commercially available type known as a wireless igniter, is mounted in a suitable recess 33 therefor in the upper end portion 15 of the housing 11 and connected by a suitable electrical conduit, not shown, to a controlled source of an electrical signal. A hollow elongated piston assembly 35 open at its upper end is disposed within the cylindrical chamber 17 so that it supports an elongated generally cylindrical hollow grain of progressive burning powder 37 adjacent to the igniter 31. Piston assembly 35 also supports a percussion piston 39 fixedly secured to or formed integrally with a percussion pin 41 and supported within a generally cylindrical recess therefor by means of a compression ring 43 of a soft material such as copper or the like, so that the pointed lower end portion of the percussion pin 41 is disposed adjacent to but not in bearing contact with, a percussion igniter 45 mounted in the lower end face of the piston assembly 35 and disposed adjacent to a powder wafer 47 which with the piston assembly 35 and the various elements enclosed or supported thereby is maintained in position within the cylinder 11 by a suitable cylindrical plug 49 which may be fixedly secured within the lower portion 19 of cylinder 11 by a pressed fit therein or by threadable engagement therewith or by a suitable locking pin therethrough.

In operation, the device comprising the instant invention, as shown in Fig. 1, is mounted in the manner indicated in Fig. 1 so that it serves as a single point suspension for a store mounted beneath the wing or fuselage of an aircraft by virtue of its threadable engagement with the store 80 and the engagement of its recesses 13 with the supporting elements 90 of a suitable releasable supporting assembly mounted within or upon an aircraft. It is to be understood that the store 80 may be prevented from rotation about the longitudinal axis of the assembly 10 by any suitable restraining means such as conventional sway brace assemblies. When the store 80 is to be released from an aircraft, the wireless igniter 31 is detonated by an electrical impulse from the electrical system of an aircraft to which it is connected. The detonation of igniter 31 ignites the low density propellant powder grain 37, the geometry of which is designed to produce progressive burning. The gas pressure initially developed by the burning powder grain 37 is exerted on the percussion piston 39 initially supported by the compression ring 43. However, at a predetermined relatively low value of the pressure applied in this manner the percussion piston 39 will crush the compression ring 43 and thereby displace the percussion pin 41 sufficiently to set off the percussion igniter 45 which in turn will detonate the high density, high explosive wafer 47. The detonation of the wafer 47 will rupture the reduced cross section 23 of the cylinder 11, thus severing the sole connection between the store and the aircraft. During the time interval required for the action described above to take place, the powder grain 37 continues to burn, building up the pressure within the chamber defined by the hollow piston assembly 35 and the cylinder 11 to the most efficient operating pressure. With the sole connection between the store and the aircraft severed, the piston assembly 35 is free to exert the necessary downward ejection force upon the store 80, developed by the gas pressure within the piston assembly 35 and the cylinder 11. The force thus generated will be of a substantially constant magnitude due to the progressive burning of the powder grain 37 accompanied by downward displacement of the piston assembly 35, and will act over the entire distance through which the piston is contained within the cylinder 11. The distance traveled by the piston assembly 35 within the housing 11 may conveniently be of the order of 3 inches, for effective ejection of a store 80 supported by the assembly 10.

With the arrangement illustrated in Fig. 1, the ejector bolt assembly 10 is ruptured at the portion 23 at a relatively low pressure which minimizes the reaction load upon adjacent aircraft structure resulting from operation of this device. Moreover, the characteristics of the powder wafer 47 and its explosive effect are such that the force generated by the wafer 47 is principally effective radially of the bolt cylinder 11 to rupture the portion 23 after which its explosive effect is dissipated primarily radially with a minimum application of force longitudinally of the ejector bolt assembly 10 in either direction. Thereafter, continued burning of the powder grain 37 as the piston assembly 35 is displaced downwardly relative to the bolt cylinder 11 produces a substantially constant pressure which precludes the application of an excessive peak reaction load to the airframe through the supporting elements 90.

Referring now to Fig. 2, and to Figs. 3 and 4 taken on lines 3—3 and 4—4, respectively, of Fig. 2, the embodiment of the instant invention illustrated therein comprises an airborne store ejection bolt assembly generally designated by the reference numeral 10' including a hollow bolt cylinder 11 closed at its upper end by end portion 15 provided with a suitable recess to accommodate an electrical igniter assembly 31' disposed adjacent to and connected by a suitable opening to the cylindrical chamber 17' formed by the circumferential walls of the bolt cylinder 11 and its end portion 15, and provided with a lower portion 19' having external threads 21 for engagement with corresponding internal threads in the store well of a store represented in Fig. 2 by a broken away phantom showing designated by reference numeral 80, and connected to the remainder of the bolt cylinder 11 by a portion 23' substantially reduced in cross section by an annular groove 24' in the bolt cylinder 11. The chamber 17' within the bolt cylinder 11 terminates at its upper end in an enlarged annular recess 55, shown also in Fig. 3, and at its lower end in an enlarged internally threaded portion arranged to receive an externally threaded plug 49' provided at its lower end with an integrally formed collar which provides a shoulder for engagement with the lower end of the portion 19' of bolt cylinder 11 to properly position the plug 49' in relation to the cylinder 11. The chamber 17' accommodates an elongated hollow piston assembly 35' open at its upper end adjacent to the electrical igniter assembly 31' and arranged to accommodate a low density propellant type powder grain 37' therein. The upper end of the piston assembly 35' is provided with a plurality of radially extending depressions 51 separated by radially extending projections 53, as shown in Figs. 2 and 3. In addition, the piston assembly 35' is provided, as shown in Figs. 2 and 4, with a plurality of longitudinally extending recesses 57 spaced circumferentially of its outer surface, separated by flutes 58, arranged to interconnect the annular groove 24' and the annular recess 55 and stop short of the upper end of the piston assembly 35' to form a circular sealing surface 59 for engagement with the circumferential surface of the chamber 17' after initial downward displacement of the piston assembly 35'. The piston assembly 35' is positioned within the chamber 17' by a sealing member 36 of soft material such as copper or the like supported by the plug 49'.

In the embodiment of the instant invention illustrated in Fig. 2, as in the embodiment illustrated in Fig. 1, means are provided for controlling sequential operations effected by forces generated by explosive gases. In operation, the electrical igniter assembly 31' is detonated by an electrical impulse from the electrical system of an aircraft in which this device is installed. This detonation ignites the powder grain 37' to generate gas pressure which initially travels radially outward through depressions 51 thence downwardly through the annular recess 55 to and through the longitudinal recesses 57 to the annular groove 24' wherein sufficient force is applied to rupture the reduced cross section 23' of the bolt cylinder 11 and thereby free the store 80 from the aircraft to which it is attached by means of the ejector bolt assembly 10'. Thereafter, the continued generation of gas pressure due to burning of the powder grain 37' results in initial downward displacement of the piston assembly 35' within the bolt cylinder 11 so that the circular seal 59 engages the circumferential surface of the chamber 17' and cuts off the longitudinal recesses 57 from the annular recess 55 to confine the explosive gases generated by the powder grain 37' within the space defined by the piston assembly 35' and the bolt cylinder 11 as the piston assembly 35' is driven downwardly by the gas pressure generated therein.

In the event of failure of the electrical system of an aircraft in which either embodiment of the instant invention is installed which precludes detonating the electrical igniter assembly 31 or the electrical igniter assembly 31' to initiate explosive operation of this device, the store supported thereby may be jettisoned from an aircraft on which it is supported by operation of a mechanically operable releasable supporting means therefor including the supporting elements 90 represented by phantom lines in Fig. 1 in operative relation to the instant invention. Moreover, after either embodiment of the instant invention has been explosively operated to release a store, the remaining upper portion of the bolt cylinder 11 may be released mechanically from the supporting elements 90 in the manner described above to eliminate unnecessary weight and drag loads and thereby save fuel.

Thus, the instant invention provides a lightweight, compact, self-contained airborne store ejection bolt assembly which provides for release and ejection of an airborne store by sequentially controlled application of explosive forces to produce the desired result with a minimum adverse effect upon the adjacent structure of an aircraft in which the instant invention is installed, designed to require a minimum number of parts, to be expendable in order to eliminate maintenance and servicing, and to be jettisonable by mechanical means under emergency conditions.

Obviously, many modifications and variations of the present invention are possible in the light of the above teachings. It is, therefore, to be understood that within the scope of the appended claims the invention may be practiced otherwise than as specifically described.

What is claimed is:

1. A store ejector bolt comprising an elongated hollow body provided at its open lower end with engaging means for connection with a store to be suspended therefrom and at its closed upper end with means for engagement with supporting means therefor, said hollow body having an abruptly reduced cross section extending peripherally thereof adjacent said engaging means and disposed between relatively enlarged sections thereof, a hollow piston assembly closed at its lower end mounted for sliding movement within said hollow body and forming a substantially closed chamber between the respective closed ends of said hollow body and said hollow piston, a progressively burning powder charge disposed within the chamber so formed, means at the lower end of said elongated hollow body for restraining said piston assembly against sliding movement relative to said hollow body, means for igniting the powder charge, and rupture producing means responsive to the ignition of said powder charge for fracturing the reduced cross section of said hollow body, said rupture producing means comprising a powder wafer disposed adjacent the lower end of said hollow piston assembly and in substantial alignment with said reduced cross section, a percussion igniter mounted in the lower end of said hollow piston assembly, a percussion piston slidably supported in the lower end of said hollow piston assembly in a recess in communication with the interior of the hollow piston assembly, and a percussion pin attached to said percussion piston and projecting downwardly to a point adjacent to the percussion igniter, whereby the percussion piston is driven downwardly upon discharge of a detonator so that the percussion pin strikes the igniter to explode the powder wafer so that a store may be released instantaneously from supporting means therefor, and said piston assembly may thereafter be displaced rapidly relative to said hollow body by continued burning of said powder charge.

2. A store ejector bolt comprising an elongated hollow body provided at its open lower end with engaging means for connection with a store to be suspended therefrom and at its closed upper end with means for engagement with supporting means therefor, said hollow body having an abruptly reduced cross section extending peripherally thereof adjacent said engaging means and disposed between relatively enlarged sections thereof, a hollow piston assembly closed at its lower end mounted for sliding movement within said hollow body and forming a substantially closed chamber between the respective closed ends of said hollow body and said hollow piston, a progressively burning powder charge disposed within the chamber so formed, means at the lower end of said elongated hollow body for restraining said piston assembly against sliding movement relative to said hollow body, means for igniting the powder charge, and rupture producing means responsive to the ignition of said powder charge for fracturing the reduced cross section of said hollow body, said rupture producing means comprising radially extending recesses in the upper end of said hollow piston assembly, an annular enlargement extending a short distance down the interior wall of said body adjacent the top, and a plurality of grooves extending longitudinally of the exterior surface of said hollow piston assembly initially overlapping said annular enlargement but stopping short of the upper end of said hollow piston assembly, whereby the initial pressure generated by discharge of the detonator is transmitted outwardly through the radially extending recesses and downwardly through the annular enlargement and the plurality of grooves to the area adjacent to the reduced cross section to fracture the body before initial downward movement of the hollow piston assembly in response to burning of the explosive charge cuts off the flow from the annular enlargement to the plurality of grooves, whereby a store may be released instantaneously from supporting means therefor, and said piston assembly may thereafter be displaced rapidly relative to said hollow body by continued burning of said powder charge.

3. A unitary supporting means for releasably suspending a store from a vehicle comprising a store ejector bolt including an elongated generally cylindrical hollow body externally threaded at the lower end for attachment to a store suspended therefrom and having a closed upper end to be engaged by a store supporting assembly, an annular groove in the circumferential wall of the body adjacent to the externally threaded portion, an elongated hollow piston assembly open at its upper end mounted for sliding movement within the hollow body, a retaining means restraining said hollow piston assembly from movement relative to said hollow body, a relatively slow burning explosive charge within the hollow piston assembly, detonating means mounted in the upper end of the body for igniting the explosive charge, and rupture producing means for directing a substantial force against said hollow body adjacent the annular groove to fracture the hollow body when the detonating means is discharged and before the explosive charge is burned sufficiently to forcibly displace the hollow piston assembly, said rupture producing means comprising a powder wafer disposed adjacent the lower end of said hollow piston assembly and in substantial alignment with said annular groove, a percussion igniter mounted in the lower end of said hollow piston assembly, a percussion piston slidably supported in the lower end of said hollow piston assembly in a recess in communication with the interior of the hollow piston assembly, and a percussion pin attached to said percussion piston and projecting downwardly to a point adjacent to the percussion igniter, whereby the percussion piston is driven downwardly upon discharge of the detonator so that the percussion pin strikes the igniter to explode the powder wafer before the hollow piston assembly is displaced by the burning explosive charge.

4. A unitary supporting means for releasably suspending a store from a vehicle comprising a store ejector bolt including an elongated generally cylindrically hollow body externally threaded at its lower end for attachment to a store suspended therefrom and having a closed upper end to be engaged by a store supporting assembly, an annular groove in the circumferential wall of the body adjacent to the externally threaded portion, an elongated hollow piston assembly open at its upper end mounted for sliding movement within the hollow body, a retaining means restraining said hollow piston assembly from movement relative to said hollow body, a relatively slow burning explosive charge within the hollow piston assembly, detonating means mounted in the upper end of the body for igniting the explosive charge, and rupture producing means for directing a substantial force against said hollow body adjacent the annular groove to fracture the hollow body when the detonating means is discharged and before the explosive charge is burned sufficiently to forcibly displace the hollow piston assembly, said rupture producing means comprising radially extending recesses in the upper end of said hollow piston assembly, an annular enlargement extending a short distance down the interior wall of said body adjacent the top, and a plurality of grooves extending longitudinally of the exterior surface of said hollow piston assembly initially overlapping said annular enlargement but stopping short of the upper end of said hollow piston assembly, whereby the initial pressure generated by discharge of the detonator is transmitted outwardly through the radially extending recesses and downwardly through the annular enlargement and the plurality of grooves to the area adjacent to the annular groove to fracture the body before initial downward movement of the hollow piston assembly in response to the burning of the explosive charge cuts off the flow from the annular enlargement to the plurality of grooves.

References Cited in the file of this patent

UNITED STATES PATENTS

| | | |
|---|---|---|
| 2,397,781 | Fischer | Apr. 2, 1946 |
| 2,421,807 | Richey et al. | June 10, 1947 |
| 2,489,984 | Shoemaker | Nov. 29, 1949 |
| 2,556,672 | Bergh et al. | June 12, 1951 |
| 2,653,504 | Smith | Sept. 29, 1953 |
| 2,713,287 | Domoj | July 19, 1955 |
| 2,732,765 | Boyd | Jan. 31, 1956 |
| 2,815,698 | Burrows | Dec. 10, 1957 |

FOREIGN PATENTS

| | | |
|---|---|---|
| 56,948 | Netherlands | Sept. 15, 1944 |
| 609,456 | Great Britain | Sept. 30, 1948 |